United States Patent Office.

THOMAS J. PLATT, OF NEWARK, NEW JERSEY.

Letters Patent No. 61,094, dated January 8, 1867.

---

IMPROVED ARTIFICIAL TRIPOLI FOR POLISHING.

---

*The Schedule referred to in these Letters Patent and making part of the same.*

---

TO ALL WHOM IT MAY CONCERN:

Be it known that I, THOMAS J. PLATT, of Newark, county of Essex, and State of New Jersey, have invented a new and improved American Tripoli; and I do hereby declare that the following is a full, clear, and exact description thereof, which will enable others skilled in the art to make and use the same.

It is well known that the fine polishing material known as tripoli is a mineral substance, found in different foreign countries, and that large quantities of it are annually imported into this country for the use of manufacturers of jewelry and fine cutlery, as well as for domestic use. Until recently, all efforts to discover or produce an article which would successfully compete with the foreign tripoli has proved fruitless; consequently large sums of money have annually left the country to pay for this article. Having been for some time personally interested in this article, and with a very thorough knowledge of what our manufacturers require in their business, I have made extensive researches and experiments to discover or produce a substance which would answer as a substitute, and have at length succeeded to my entire satisfaction. I employ a loam, which is believed to be a clay slightly colored by the oxide of iron, and containing quartz in the form of very fine sand, which, when combined with the substances hereinafter named, possesses all the valuable qualities of the best foreign tripoli. Although it is a compound, and prepared with a great deal of care, I am able to furnish it to consumers at a much less price than the foreign tripoli commands. In preparing my American tripoli, the loam before mentioned, properly cleansed, forms about half of the compound; plaster of Paris, (calcined,) one fourth; yellow ochre, one fourth. It is necessary to vary these proportions somewhat, to suit the different uses or articles to which it is applied; but about the above proportion will be found to suit the general market. But I do not confine myself to those particular proportions.

Having thus described my invention, what I claim as new, and desire to secure by Letters Patent, is—

A polishing material composed of the substances herein named and described, substantially as and for the purposes set forth.

The above specification of my invention signed by me this 13th day of October, 1866.

THOS. J. PLATT.

Witnesses:
WM. F. McNAMARA,
ALEX. F. ROBERTS.